Patented Aug. 23, 1932

1,873,514

UNITED STATES PATENT OFFICE

PAUL VIRCK, OF WOLFEN, NEAR BITTERFELD, AND GEORG MATZDORF, OF DESSAU IN ANHALT, GERMANY, ASSIGNORS TO GENERAL ANILINE WORKS, INC., OF NEW YORK, N. Y., A CORPORATION OF DELAWARE

SULPHUR DYE

No Drawing. Application filed December 29, 1931, Serial No. 583,794, and in Germany February 6, 1931.

Our present invention relates to a new sulphur dye and to a process of manufacturing the same.

According to this invention sulphur dyes fast to washing are obtainable by melting a mixture of diphthaloyl-para-phenylenediamine and meta-toluylene-diamine with sulphur. They are readily soluble in hot sodium sulphide solution and are distinguished by the clear orange shades of their dyeings.

The following example illustrates the invention, the parts being by weight:—

360 parts of meta-toluylenediamine, 160 parts of diphthaloyl-para-phenylenediamine (as obtainable, for instance, by heating phthalic anhydride with para-phenylenediamine in an aqueous medium) and 1500 parts of sulphur are melted at about 215° C. until the evolution of hydrogen sulphide ceases. The cooled melt is finely pulverized and, after being ground together with a small quantity of Turkey red oil as a wetting agent, it can directly be used as a commercial product. The dye is readily soluble in hot sodium sulphide solution and dyes the vegetable fiber clear orange tints of good fastness to washing.

It is also possible to dissolve the melt in the known manner in sodium sulphide solution and to dry the solution thus obtained.

Our present invention is not limited to the foregoing example or to the specific details given therein; thus, for instance, the amount of the reacting components may be varied in a certain range and such variations are intended to be in the scope of the claims following hereafter.

What we claim is:—

1. A process for manufacturing a new sulphur dye which comprises melting a mixture of meta-toluyl-enediamine and diphthaloyl-paraphenylenediamine with sulphur.

2. A process for manufacturing a new sulphur dye which comprises melting a mixture of 360 parts by weight of meta-toluylenediamine and 160 parts by weight of diphthaloylparaphenyldiamine with 1500 parts by weight of sulphur.

3. A process for manufacturing a new sulphur dye which comprises melting a mixture of 360 parts by weight of meta-toluylenediamine and 160 parts by weight of diphthaloylparaphenylenediamine with 1500 parts by weight of sulphur at about 215° C.

4. As a new product a sulphur dye, being readily soluble in hot sodium sulphide solution, being distinguished by the clear orange shades of its dyeings, having a good fastness to washing, and being obtainable by sulphurizing a mixture of meta-toluylenediamine and diphthaloylparaphenylenediamine.

In testimony whereof, we affix our signatures.

PAUL VIRCK.
GEORG MATZDORF.